US009380332B1

United States Patent
Mills et al.

(10) Patent No.: US 9,380,332 B1
(45) Date of Patent: Jun. 28, 2016

(54) VIDEO ADVERTISEMENT CACHING

(71) Applicant: Amazon Technologies, Inc., Reno, NV (US)

(72) Inventors: Brent Robert Mills, Seattle, WA (US); Cyrus Khoshnevisan, Mercer Island, WA (US); Dan Catalin Teodorescu, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1 day.

(21) Appl. No.: 13/899,094

(22) Filed: May 21, 2013

(51) Int. Cl.
*H04N 7/10* (2006.01)
*H04N 7/025* (2006.01)
*H04N 21/43* (2011.01)

(52) U.S. Cl.
CPC ..................................... *H04N 21/43* (2013.01)

(58) Field of Classification Search
CPC ....................................................... H04N 21/43
See application file for complete search history.

(56) References Cited

U.S. PATENT DOCUMENTS

| | | | |
|---|---|---|---|
| 8,209,715 B2 * | 6/2012 | Liao et al. | 725/34 |
| 2002/0083443 A1 * | 6/2002 | Eldering et al. | 725/34 |
| 2007/0186254 A1 * | 8/2007 | Tsutsui et al. | 725/87 |
| 2007/0283384 A1 * | 12/2007 | Haeuser et al. | 725/34 |
| 2010/0251289 A1 * | 9/2010 | Agarwal et al. | 725/34 |
| 2012/0304223 A1 * | 11/2012 | Sargent et al. | 725/32 |
| 2013/0013392 A1 * | 1/2013 | Kejariwal | 705/14.42 |
| 2013/0046618 A1 * | 2/2013 | Ferber | G06Q 30/02 |
| | | | 705/14.45 |
| 2013/0091520 A1 * | 4/2013 | Chen | 725/34 |

\* cited by examiner

*Primary Examiner* — Oschta Montoya
(74) *Attorney, Agent, or Firm* — Thorpe North & Western LLP

(57) ABSTRACT

A method is described for selecting and caching a video advertisement to be presented on a client device. The method may include determining customer interests for an individual customer, selecting a video advertisement based upon the customer's interests and providing the video advertisement to a client device so that the video advertisement may be cached on the client device and may be available to display to a customer when a customer selects video content to play on the client device.

19 Claims, 9 Drawing Sheets

VIDEO ADVERTISEMENT CACHING

BACKGROUND

The growing popularity of consuming media content over a computer network has opened up a new avenue of advertising to video consumers. In some respects, consumers may be moving away from watching scheduled TV network programs to consuming programs, movies and other types of media over a network at the consumer's leisure. Consuming media content over a computer network may pose a challenge to advertisers that may have in the past relied upon TV network advertising. To compensate for the shift in viewing habits of customers, providers of media content delivered over a network may offer to advertisers the purchase of video advertisements that may be displayed to a customer before, during and/or after media content may be viewed by the customer.

Purchasers of video advertisement placements have an expectation that a video advertisement is likely be seen by a potential customer consuming the media content. In some cases, a video advertisement may not be seen by a customer due to latency in receiving and displaying a video advertisement. More specifically, a video advertisement may take several seconds or more to display on a device because of the overhead that may be needed to determine which video advertisement to display to a customer and download the video advertisement. One reason a video advertisement may not be seen is that a customer may abandon the video advertisement prior to the video advertisement fully loading on a device. This may be due to the latency of the video advertisement loading onto a device and after a few seconds of waiting, the customer may lose patience and terminate the video advertisement and the selected video content from playing.

DETAILED DESCRIPTION

Figure 1:
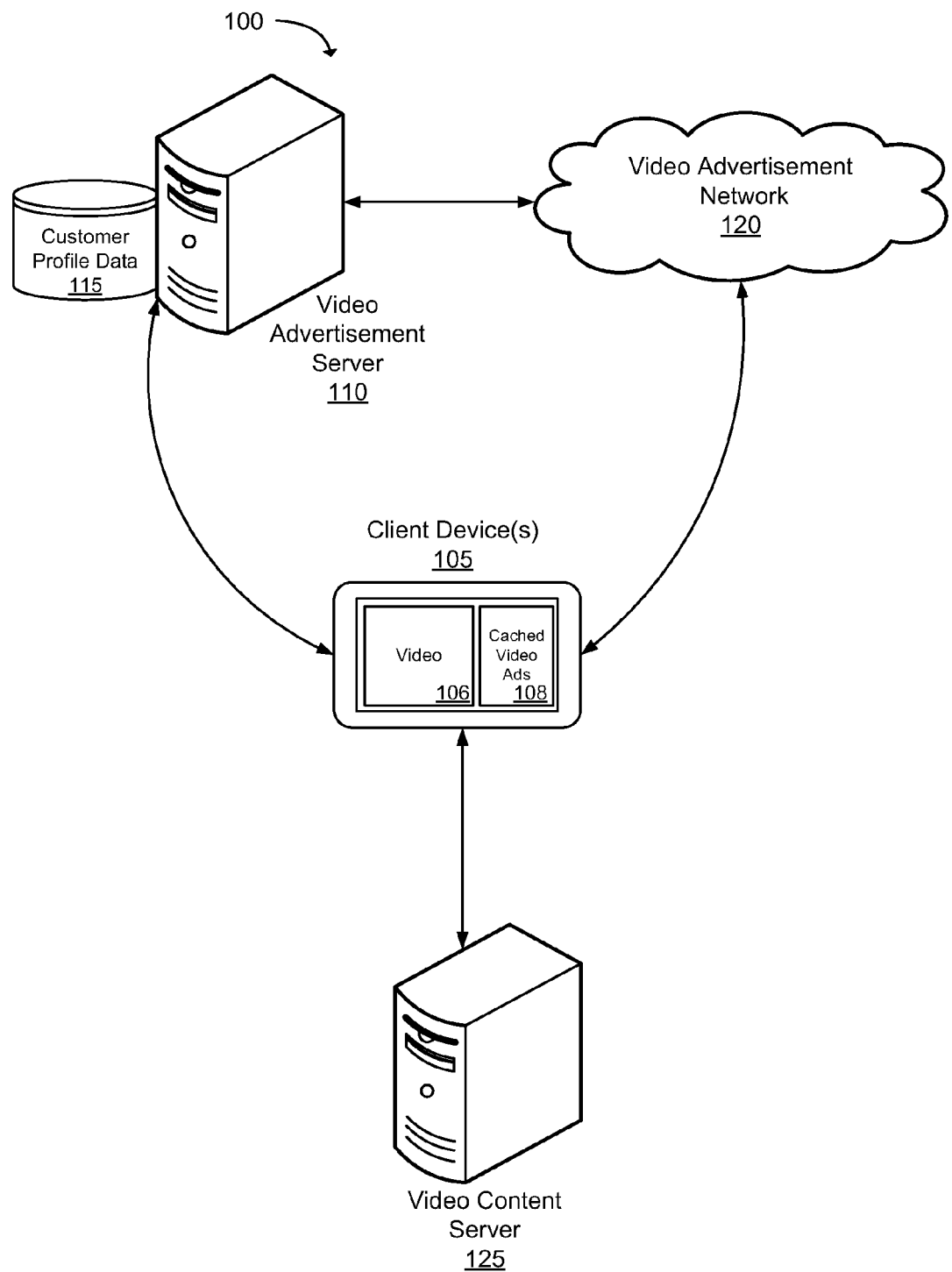
FIG. 1 is a diagram illustrating an example system for ranking and caching video advertisements to display on a client device.

A technology is described for selecting video advertisements based upon a customer's profile and/or other customer associated data and caching the video advertisements on the customer's client device so that the video advertisement may be available to display prior to the customer selecting primary video content. Purchasers of video advertisement placements may have an expectation that a video advertisement will likely be seen by a potential customer. As a result, a company that provides a video advertisement service may have an incentive to ensure that when a video advertisement is sent to a client device, the video advertisement may be viewed by a potential customer. One way to improve the probability that a potential customer may see a video advertisement may be to cache one or more video advertisements on a client device so that the video advertisement may be available prior to or near the same time that primary video content selected by a customer begins to load on the client device.

A video advertisement may be used to advertise products, services and/or provide information. Video advertisements may include full motion video that may be displayed to a customer prior to a primary video, during a primary video or after a primary video. In some cases, a video advertisement may incorporate a partially transparent overlay banner or embedded links that may direct a customer to an electronic page (e.g., website) when selected. In addition, video advertisements may incorporate animated or static text, banners, media player skins that may surround or overlay the video experience and/or rich media (e.g., animation, newscast scroll, customer controlled slide show, captioning, etc.). Also, a video advertisement may be a static advertisement that may be displayed at some point during a primary video.

A decision about which video advertisements to cache on a client device may be made based upon a customer's account and/or activity history. For example, an advertisement server may have access to a customer's account (e.g., profile) that may be used to determine the customer's interests. Also, a customer's search history and/or past purchases may be used to determine customer interests. Based upon a customer's interests, market segments associated with the customer may be selected and video advertisements from the market segments may be selected and ranked based on a performance estimate of the video advertisement. Market segment may refer to the segmentation of a target market into categories based upon demographics, geography, psychographics, behavior as well as other market segmentation approaches. An example of a performance estimate may be an estimate (e.g., a probability or a scalar value) representing whether a potential customer viewing a video advertisement may perform an action associated with the video advertisement (e.g., click on a link in the advertisement, purchase a product featured in the advertisement, etc.).

Based on a video advertisement's performance estimate, a rank may be assigned to the video advertisement that ranks the video advertisement as compared to other video advertisements. A number of video advertisements may be ranked and then a video advertisement service may instruct a video advertisement network to send the video advertisements to be cached on a client device. Because the video advertisements may be cached on the client device, the amount of time to retrieve the video advertisement from the client device's cache and display the video advertisement to a customer may be greatly reduced compared to the amount of time to receive the video advertisement from a video advertisement service at the time a customer selects a primary video.

Additional video advertisements may be sent to a client device on a regular basis. For instance, after a period of time, cached video advertisements may become stale and may be replaced by new video advertisements. Client devices that periodically connect to a network may be sent video advertisements when connected and video advertisements that may have been displayed may be replaced with new video advertisements.

FIG. 1 is a diagram illustrating a high level example of a system 100 for caching and displaying video advertisements on a client device. The system 100 may include a number of client devices 105 that may be capable of receiving and playing video content over a network, a video advertisement server 110 that may have access to a data store containing customer profile data 115, a video advertisement network 120 that provides a number of video advertisements to the client devices 105 and a video content server 125 that may provide video content over a network to the client devices 105.

A client device 105 may store a number of cached video advertisements 108 in local storage on the client device 105, so that the cached video advertisements 108 may be available to play on the client device 105 when a video 106 may be requested from a video content server 125. Video advertisements may be sent to a client device 105 on a periodic basis to be cached on the client device 105 so that when a request for a video advertisement may be made, the request may be fulfilled by retrieving a video advertisement from the cached video advertisements 108. For example, a customer using a client device 105 may select a video 106 to play. Prior to playing the video 106 on the client device 105, a video advertisement 108 may be displayed on the client device 105 to the customer. Because the video advertisements may be cached on the client device 105, the cached video advertisement 108 may be available to display on the client device 105 as soon as a customer selects a video 106 to play, therefore avoiding latency associated with requesting a video advertisement from a video advertisement server 110 and receiving the video advertisement from a video advertisement network 120.

A customer's account may be associated with a client device 105 and may be used to identify a customer and the customer's profile data 115. The client device 105 may make a request to a video advertisement server 110 for one or more video advertisements prior to a customer selecting a primary video to play on the client device 105. The video advertisement sever 110 may identify the client device 105 by, for example, an IP address or a client device ID, such as a unique device identifier (UDID), international mobile Station equipment identity (IMEI), media access control (MAC) address and/or mobile equipment identifier (MEI) that may be associated with a customer's account. Upon associating the client device 105 with a customer, the video advertisement server 110 may query a data store for customer profile data 115. In a case where a client device may not be associated with an identified customer, profile data for the client device may be available instead (e.g., client device's browsing history, search history, etc.).

In one example, customer profile data 115 may be identified by a video advertisement server 110 and used to determine one or more market interest categories that may appeal to the customer. Customer profile data 115 may include any type of information about a customer including any activity that a customer may engage in using a client device 105. Some examples of customer profile data 115 may include data such as customer demographics, purchase history, browsing history, wish lists, consumed content (e.g., programs, video and books a customer may have consumed), location history (e.g., geographic location of client device 105 via GPS or network triangulation), etc. In addition, profile data 115 may include information about a client device 105 associated with a customer, such as a unique device identifier (UDID), international mobile Station equipment identity (IMEI), mobile equipment identifier (MEI), operating system, system resource information, installed applications, browser types, etc. Customer profile data 115 may reveal certain market interests that a customer may be interested in. For example, a customer, who may have purchased sporting goods, browsed for sporting goods on an electronic retail site and/or added sporting good items to a wish list, may be interested in seeing video advertisements for sporting goods.

The video advertisement server 110 may determine several market interest categories for a customer based on a customer's profile data 115. The video advertisement server 110 may then identify a number of video advertisements that may be associated with the market interest categories by querying a video advertisement network 120 for video advertisement descriptions that match the market interest categories. For example, instead of requesting the actual video advertisement file, the video advertisement server 110 may request descriptive metadata (e.g., content description, category description, class description, etc.) for the video advertisement. The video advertisements may then be ranked by the video advertisement server 110 by assigning a higher rank to video advertisements that may be closely aligned with a customer's interests compared to a video advertisement that may be remotely related to a customer's interests. For example, where a customer may show an interest in science fiction novels, a video advertisement for a science fiction movie preview may be ranked higher than a video advertisement for a historical documentary preview.

One or more top ranked video advertisements may be selected by the video advertisement server 110 and the video advertisement server 110 may instruct the client device 105 to request the video advertisements from a video advertisement network 120. The video advertisement server 110 may provide the video advertisement rankings to the client device 105 and upon receiving the video advertisements, the client device 105 may store the video advertisements in the client device's cache in a queue, or other type of data structure (e.g., array, tree, stack or heap) according to the rank of the video advertisements.

As cached video advertisements 108 may be retrieved from the queue in the client device's cache, the remaining cached video advertisement's queue position numbers may be incremented and consumed video advertisements may be deleted. The queue may be replenished from time to time with additional video advertisements received from the video advertisement network 120. In one example, a video advertisement may be provided to a client device at a predetermined frequency. A predetermined frequency may be a set frequency (e.g., weekly, daily, every hour, etc.) at which video advertisements may be sent to a client device 105. One example of a time at which video advertisements may be sent to a client device 105 may be determined by a customer's video consumption behavior. For instance, where a customer regularly consumes video content (e.g., nightly), a pattern of video consumption may be determined and video advertisements may be provided to the customer's client device 105 based upon the identified pattern. In an additional example, video advertisements may be removed from the cache of a client device when a video advertisement expires and replaced with a new video advertisement. For instance, some video advertisements may advertise a discount for a product or service that may only be good for a limited time period. Once the time period may have expired, the video advertisement may be removed from a client device's cache and replaced with a new video advertisement. Video advertisements may also expire after they have been presented to a user a predetermined number of times.

In FIG. 1, the client device 105 may provide updates to the customer profile data 115 on a regular basis, thus providing the video advertisement server 110 with current information about a customer associated with the client device 105. For instance, as a customer associated with the client device 105 shops, makes purchases, consumes media content, clicks on advertisements, etc., these events may be recorded in a customer account that contains customer profile data 115. The video advertisement server 110 may regularly retrieve the customer profile data 115 to determine whether the cached video advertisements 108 stored on the client device 105 may still be the most appropriate video advertisements to display to the customer. In the event that the video advertisement server 110 may determine that another video advertisement may be a better video advertisement than one cached on the client device 105, the video advertisement server 110 may, for example, instruct the client device 105 to delete the cached video advertisement 108 or to demote the cached video advertisement 108 to a lower position or priority in the queue. The video advertisement server 110 may then instruct the client device 105 to request a new video advertisement from the video advertisement network 120 to replace the cached video advertisement 108 deleted or demoted. Alternatively, the video advertisement server 110 may instruct the video advertisement network 120 to send to the client device 105 a new video advertisement to replace the cached video advertisement 108.

Figure 2:
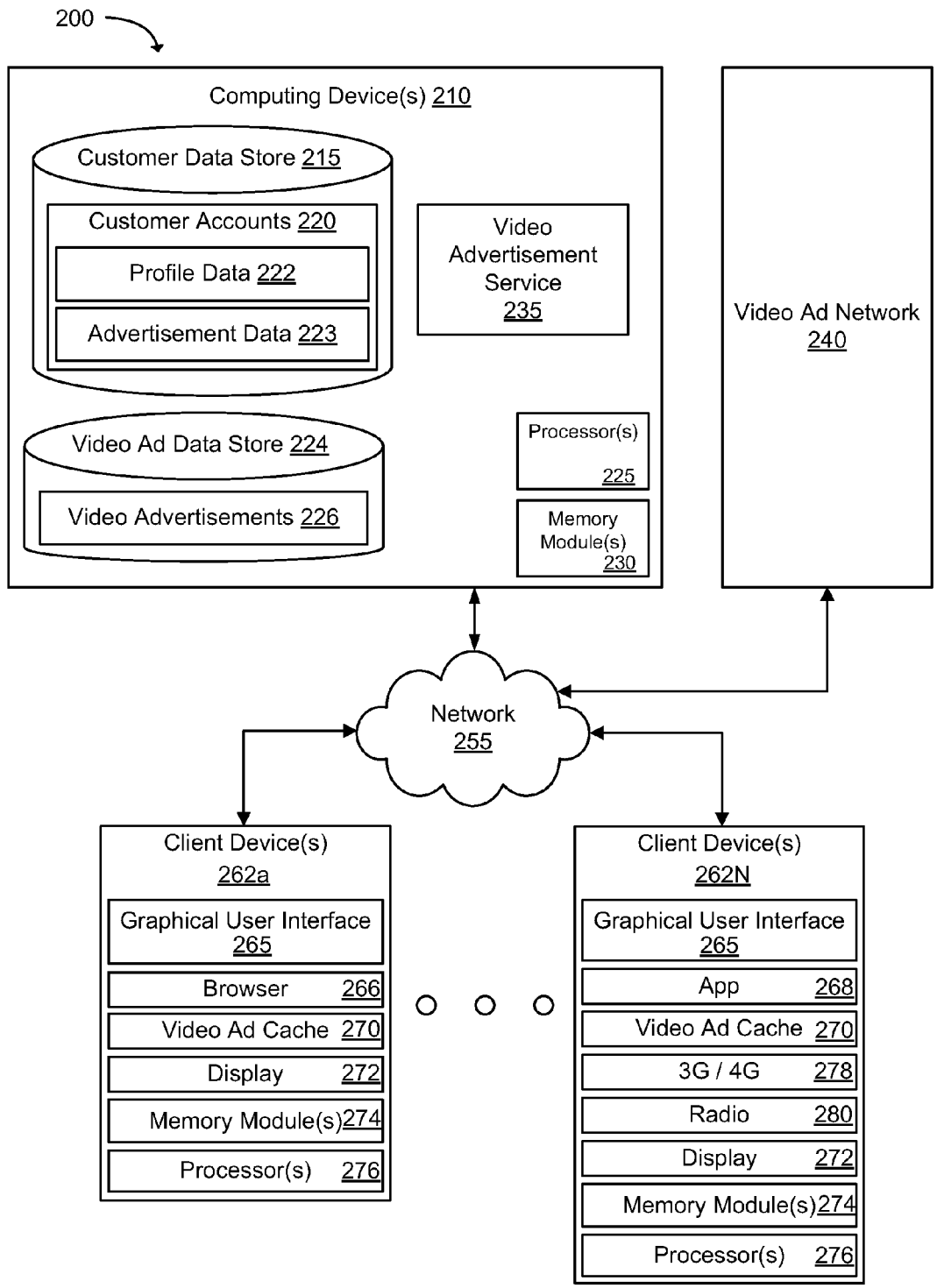
FIG. 2 is a block diagram illustrating an example system for ranking and caching a video advertisement.

FIG. 2 illustrates an example system 200 that may be used to select and rank video advertisements which then may be cached on a client device 262a-N according to various examples of the present technology. The system 200 may contain one or more computing devices 210 that may be in data communication with a number of client devices 262a-262N by way of a network 255. Various applications and/or functionality may be executed in the computing device 210. The computing device 210 may comprise, for example, a server or any other system providing computing capability. Alternatively, a number of computing devices 210 may be employed that are arranged, for example, in one or more server banks or computer banks or other arrangements. For purposes of convenience, the computing device 210 is referred to in the singular, it is understood that a plurality of computing devices 210 may be employed in the various arrangements as described above.

Operations may be computed in the system 200 using certain services and/or modules that may be executed on the computing device 210 to perform desired functions for the technology. In one configuration, the computing device 210 may include a video advertisement service 235 and other services, processes, systems, engines, or functionality not discussed in detail herein.

The video advertisement service 235 may be in communication with one or more client devices 262a-N via the computing device 210 and a network 255. The video advertisement service 235 may determine a number of video advertisements 226 to cache on a client device 262a-N. The video advertisement service 235 may make the determination of which video advertisements to cache on a client device 262a-N by retrieving a customer's profile data 222 from a customer's account 220 stored in a customer data store 215. Based on a customer's profile data 222, the video advertisement service 235 may gauge the customer's interests and then select one or more video advertisements 226 that may be related to the customer's interests. In addition, a customer's profile data 222 may be linked to a customer's social network account. The customer's social network account may be used to determine further interests that a customer may have.

Additional video advertisements 226 may be provided to a client device 262a-N on a regular basis. As an example, the video advertisement service 235 may determine additional video advertisements 226 to cache on a client device 262a-N when a customer's profile data 222 may be updated. For example, when a customer makes a purchase, responds to an advertisement, consumes media content, etc., the customer's profile data 222 may be updated with the customer's activity. Using the updated profile data 222, the video advertisement service 235 may determine additional video advertisements 226 that may be best directed to the customer based upon the customer's interests.

The video advertisement service 235 may respond to video advertisement requests made to the video advertisement service 235 by providing one or more video advertisements 226 from a video advertisement data store 224. Alternatively, the video advertisement service 235 may instruct a third-party network, such as a video advertisement network 240 to send the one or more video advertisements to the client device 262a-N. The advertisement service 235 may execute logic that enables the advertisement service 235 to calculate a performance estimate for a video advertisement and then select and rank one or more video advertisements to send and cache on a client device 262a-N. Example logic executed by the advertisement service 235 will be discussed in further detail below in conjunction with FIG. 3.

A client device 262a-N may include any device that may be capable of sending and receiving data over a network 255. A client device 262a-N may comprise, for example a processor-based system such as a computing device. Such a computing device may contain one or more processors 276, one or more memory modules 274 and a graphical user interface 265. A client device 262a-N may be a device such as, but not limited to, a desktop computer, laptop or notebook computer, tablet computer, smart TV, a cell phone, smart phone, e-book reader, digital music player or other devices with like capability. The client device 262a-N may include a browser 266 that may enable the client device 262a-N to render a video advertisement that may be displayed on a media player executing within the browser 266. Also, the client device 262a-N may have one or more applications 268 installed on the client device 262a-N that may request one or more video advertisements to display within the application 268. Video advertisements may be stored on the client device 262a-N in a video advertisement cache 270. The client device 262a-N may include a display 272, such as a liquid crystal display (LCD) screen, gas plasma-based flat panel display, LCD projector, cathode ray tube (CRT), or other types of display devices, etc. The client device 262a-N may contain hardware that may enable the client device 262a-N to connect to a network 255 using mobile communication protocols such as 3G and/or 4G 278. Additionally, the client device 262a-N may contain a radio 280 that enables the client device 262a-N to connect to a network 255 by way of a wireless local area network connection such as WI-FI or Bluetooth®.

The computing device 210 may contain various processes and/or other functionality that may be executed on one or more processors 225 that are in communication with one or more memory modules 230 according to various examples. Various data may be stored in a customer data store 215 and a video advertisement data store 224 that may be accessible to the computing device 210. The customer data store 215 may contain customer accounts 220. Each customer account 220 may include profile data 222 and advertisement data 223. A customer's profile data 222 may contain a description of a customer, such as, but not limited to, demographic, geographic, psychographic characteristics as well as purchase patterns, creditworthiness, media consumption history, purchase history, browsing history, advertisement response history, etc. Advertisement data 223 may provide a record of video advertisements that may have been presented to a customer and video advertisements that may be currently cached in an individual client device's video advertisement cache 270.

The video advertisement data store 224 may contain video advertisements 226 that may be retrieved from the video advertisement data store 224 by the video advertisement service 235 and sent to a client device 262*a*-N. In additional example systems 200, video advertisements 226 may be stored on a third-party video advertisement network. The term "data store" may refer to any device or combination of devices capable of storing, accessing, organizing and/or retrieving data, which may include any combination and number of data servers, relational databases, object oriented databases, cloud storage systems, data storage devices, data warehouses, flat files and data storage configuration in any centralized, distributed, or clustered environment. The storage system components of the customer data store 215 and the video advertisement data store 224 may include storage systems such as a SAN (Storage Area Network), cloud storage network, volatile or non-volatile RAM, optical media, or hard-drive type media. The customer data store 215 and the video advertisement data store 224 may be representative of a plurality of data stores as can be appreciated.

The network 255 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, cloud, grid or cluster computing system. An application program interface (API) may be provided for each module to enable a second module to send requests to and receive output from the first module. Such APIs may also allow third parties to interface with the module and make requests and receive output from the modules. While FIG. 2 illustrates an example of a system 200 that may implement the techniques above, many other similar or different environments are possible. The example environment discussed and illustrated above are merely representative and not limiting.

Figure 3:
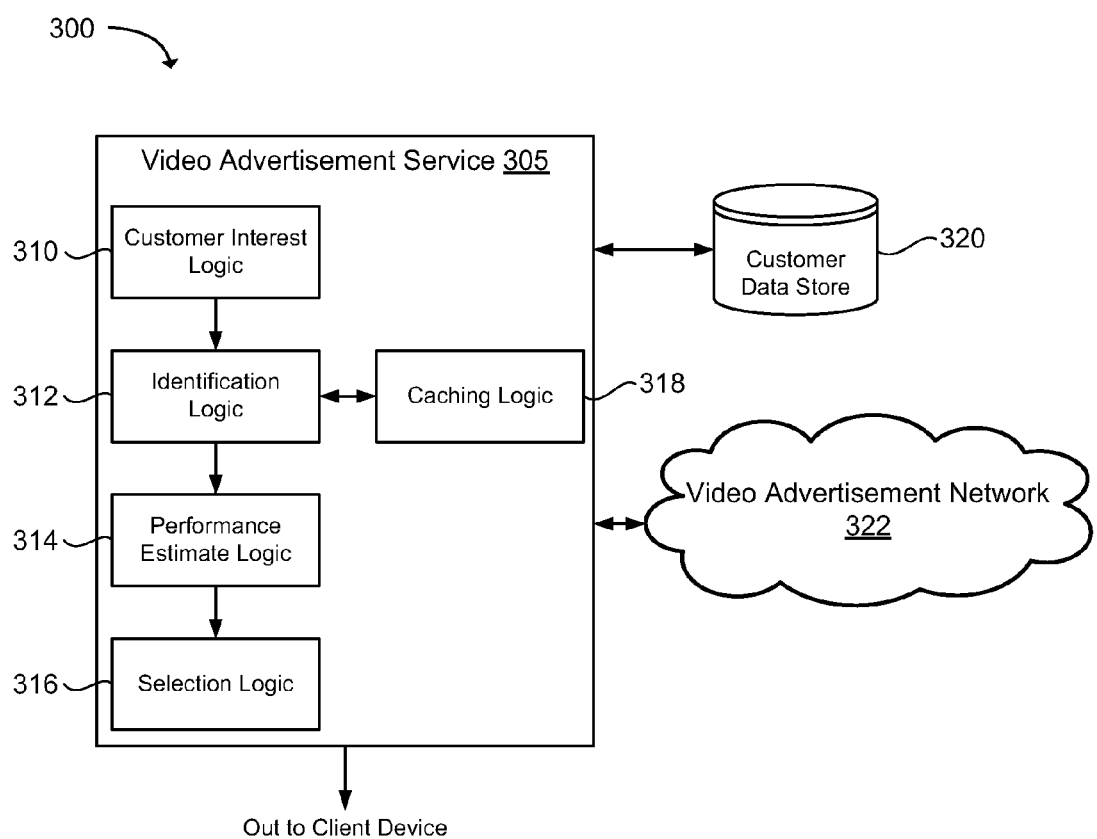
FIG. 3 is a diagram that illustrates an example video advertisement service for identifying and serving a video advertisement.

FIG. 3 illustrates an example of a system 300 that includes a video advertisement service 305 that may be executed on a computing device such as a video advertisement server. The video advertisement service 305 may execute logic that may enable the video advertisement service 305 to identify and serve video advertisements to one or more client devices. The logic executed by the video advertisement service 305 may include logic that determines customer interests 310 based upon a customer's profile, identification logic 312 that identifies video advertisements that relate to a customer's interests, logic that calculates a performance estimate 314 for a video advertisement and logic that selects one or more video advertisements 316 to cache on a client device. In addition, the video advertisement service 305 may include video advertisement caching logic 318 that identifies video advertisements cached on a client device.

In one example, the logic executed by the video advertisement service 305 may be executed in the order indicated in FIG. 3, but it is understood that a different order may be used. The video advertisement service 305 may first execute logic that determines a customer's interests 310 by retrieving customer profile data from a customer data store 320. The logic may then attempt to determine a customer's interests based upon the customer profile using information such as a customer's demographic data, geographic data, psychographic data, occupation, media consumption history, purchase history, browsing history, advertisement response history as well as any other information that may be contained in the customer profile. The categories derived from the customer profile may be used to determine market segment interests for a customer and these market segment interests may be used to identify a number of video advertisements associated with the market segment interests.

As an example, video advertisements may be assigned a number of attributes that may be used to associate a market segment to a video advertisement. Attributes may be based upon product type, service type, industry, media, demographics, geography, etc. For example, video advertisements for products may be given attributes that identify the type of product being advertised. Video advertisements for services may receive attributes that identify the type of service and location of the service being advertised. After the customer interest logic 310 determines one or more market segments that a customer may be interested in, a number of video advertisements having attributes that correlate with one or more of the market segments may be identified. For example, the customer interest logic 310 may have determined that a customer may be interested in fictional electronic books, action and adventure movies, outdoors sporting equipment and restaurant dining. These market segments may be used by the video advertisement identification logic 312 to identify a number of video advertisements having attributes that fall within the market segments. In one example, the identification logic 312 may identify a number of video advertisements for each market segment that a customer may have an interest in. For example, where a customer has an interest in fictional electronic books, action and adventure movies, outdoor sporting equipment and restaurant dining, the identification logic 312 may identify a number of video advertisements for each of these market segments and then provide the video advertisements to logic that calculates a performance estimate 314 for the video advertisements.

In the case where a client device already has one or more video advertisements cached on the client device, the caching logic 318 may identify the video advertisements that may already be cached on the client device and provide the video advertisements to the identification logic 312. The identification logic 312 may then determine whether the cached video advertisements fall within market segments identified by the customer interest logic 310, and if so, the cached video advertisements may be included with any additional video advertisements identified by the identification logic 312.

The performance estimate logic 314 may calculate a performance estimate for a video advertisement and assign the video advertisement a ranking based upon the performance estimate. In one example, a performance estimate may be an estimation of how likely a customer is to perform an action associated with a video advertisement upon viewing the video advertisement. For example, an action associated with a video advertisement may include, but is not limited to, viewing the video advertisement, clicking on a link displayed in the video advertisement, purchasing a product or service advertised in the video advertisement, performing an action described in the video advertisement, as well as other actions.

The performance estimate logic 314 may base a determination of performance of a video advertisement on how well a video advertisement aligns with a customer's interests. As an illustration, outdoors sporting equipment may be a market segment that a customer may be interested in. Several video advertisements may have been identified that fall within the outdoors sporting equipment market segment, including videos advertising fishing equipment, bicycling equipment, men's running apparel, rock climbing equipment, hiking equipment, skiing equipment and women's beach apparel. Although these video advertisements may fall within the market segment of outdoor sporting equipment, a customer may not be interested in every product that is being advertised. Therefore, the performance estimate logic 314 may compare attributes associated with a video advertisement with a customer's profile data. For example, a customer's profile may show that sometime in the past, the customer purchased running shoes. The customer's profile data may also show demographic information indicating that the customer is a man. Further, the customer's profile data may indicate that the customer recently paid for a discount entry to a marathon race. Based upon the customer's profile data, the performance logic 314 may determine that the attributes describing the video advertisement for men's running apparel align more closely with the customer's interests and therefore, may assign the video advertisement a higher performance estimate or probability as compared to other video advertisements identified in the market segment. In one example, a performance estimate assigned to a video advertisement may be a scalar numerical value indicating whether a video advertisement has a high performance estimate or low performance estimate compared to other video advertisements. In another example, a performance estimate may be a probability with a value from 0 to 1, where 0 indicates a low performance estimate and 1 indicates a high performance estimate.

In a case where video advertisements may already be cached on the client device, the performance estimate logic 314, in one example, may include the cached video advertisements with the video advertisements identified by the performance estimate logic 314 in a performance estimate calculation. For example, the cached video advertisements may be considered in combination with any new video advertisements identified, and a performance estimate may be calculated for the combination of video advertisements. In another example, video advertisements cached on the client device may be ignored by the performance estimate logic 314 and may not be included in calculating a performance estimate for video advertisements identified by the identification logic 314.

Once the performance estimate logic 314 has determined a performance estimate for the video advertisements within the one or more market segments and assigned each video advertisement a performance estimate value, the video advertisements may be ranked according to the video advertisement's performance estimate value. For example, a video advertisement's performance estimate value may be used as a ranking and the ranking may determine the order of the video advertisements in a data structure (e.g., queue, array, tree, stack) on a client device.

Upon calculating a performance estimate and ranking one or more video advertisements, the advertisement service 305 may execute selection logic 316 that selects one or more top ranked video advertisements to be cached on a client device. For example, where a higher value assigned to a video advertisement indicates a superior ranking, a number of rankings assigned to a number of video advertisements may be sorted in descending order and the video advertisements with the highest value rankings may be selected. In one example configuration, the selection logic 316 may determine the amount of storage space available on a client device and then make a determination of the number of video advertisements to cache on the client device. In another example configuration, the selection logic 316 may gauge the amount of network bandwidth available to a client device and make a decision of how many video advertisements to cache on the client device based on the available bandwidth. The video advertisements selected may then be cached on a client device in the order of the video advertisement rankings. Therefore, the video advertisement with the highest ranking may be placed at the top of a data structure, such as a queue contained in a client device's cache. In the case where the client device already has one or more video advertisements cached on the client device, the additional video advertisements being sent to the client device may be, in one example, added to the queue behind the already cached video advertisements. In another example, the video advertisements already cached on the client device may have been included in a performance estimation that included both the already cached video advertisements and the additional video advertisements identified by the identification logic 312. The mix of the already cached video advertisements and the additional video advertisements may be arranged in a queue according to the rankings of the video advertisements. And in yet a further example where the already cached video advertisements may not have been included in a performance calculation, the client device may order according to the rankings of the mix of additional video advertisements and the already cached video advertisements, after receiving the additional video advertisements.

The number of video advertisements selected by the selection logic 316 to cache on a client device may depend upon a number of factors. In one example, the number of video advertisements cached on a client device may be determined by the type of client device. For example, some types of client devices may have limited local storage and therefore, a fewer number of video advertisements may be cached. Whereas other client devices may contain ample local storage and a greater number of video advertisements may be cached on the client device. In another example, the number of video advertisements to cache on a client device may be determined by the client device's connectivity patterns to a network. For example, the advertisement service 305 may keep a record of when a client device connects to a network and the selection logic 316 may calculate a number of video advertisements to cache on the client device based upon when and how often the client device connects to a network. As an illustration, customers using a mobile device, such as a tablet computer or an electronic book reader, may occasionally connect to a network to download an application or an electronic book. The selection logic 316 may determine an average amount of time between network connections for the client device and then determine a number of video advertisements to cache on the client device based upon the average amount of time between network connections, Client devices periodically connecting to a network may receive a greater number of video advertisements to store in cache so that should a long period elapse between network connections, a sufficient number of video advertisements may be available to display on the client device. Client devices that may have a constant connection to a network or may connect to a network frequently may receive fewer video advertisements because of the client devices availability to receive video advertisements. In addition, the number of video advertisements stored in a client device's cache may be dependent upon the network bandwidth that may be available to the client device. For example, a client device that may have a greater amount of network bandwidth available may receive fewer video advertisements because of the client device's ability to receive video advertisements quickly over a network. Whereas client devices having a small amount of network bandwidth available may receive more video advertisements to cache due to the latency in receiving a video advertisement caused by having a slow network connection.

After one or more video advertisements may have been identified, ranked and selected to be cached on a client device, the video advertisement service 305 may send instructions to a video advertisement network 322 to have the client device cache the video advertisements selected by the video advertisement service 305. The video advertisement service 305 may then instruct the client device to arrange the video advertisements received from the video advertisement network 322 in a queue in the client devices cache in an order according to the rankings assigned to the video advertisements.

Figure 4:
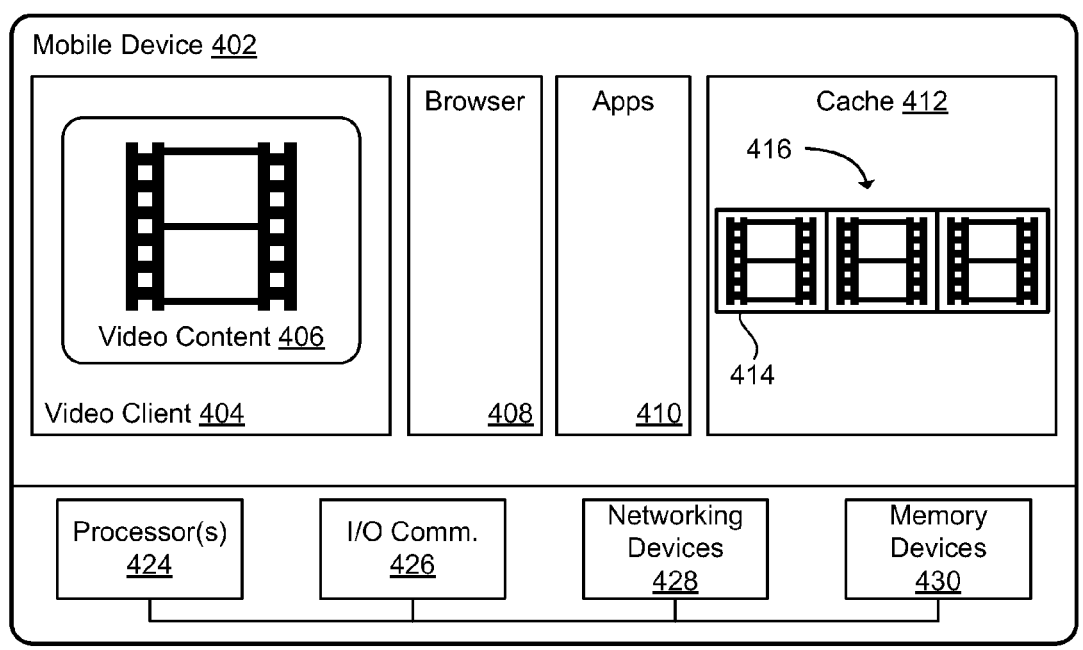
FIG. 4 is a block diagram illustrating an example of a mobile device.

Moving now to FIG. 4, an illustration of a mobile device 402 is shown that may be used to play video content 406 by way of a video client 404 executed on the mobile device 402. The mobile device 402 may also include a browser 408 and one or more applications 410 that may display and playback media content such as video by way of Input/Output (I/O) device communication 426. The mobile device 402 may include hardware memory devices 430 capable of storing video content within a cache 412. Among items stored in the cache 412, a number of video advertisements 416 may be contained in the cache 412. The video advertisements 416 may be arranged in a queue 414 according to a ranking assigned to each video advertisement. The video advertisement in the front of the queue 414 may be a video advertisement with a higher ranking as compared to other video advertisements within the queue 414.

When video content 406 may be played on the mobile device 402, logic executed on the one or more processors 424 may request that a video advertisement stored in the cache 412 be displayed on the mobile device 402 before, during and/or after the video content 406 may be played. A video advertisement may be retrieved from the front of the queue 414 and may be displayed via the video client 404. The video advertisements in the queue 414 behind the video advertisement retrieved from the queue 414 may be promoted in the queue so that the next time that a video advertisement 416 may be requested, the video advertisement now in the front of the queue 414 may be retrieved.

As video advertisements 416 are retrieved from the queue 414, additional video advertisements may be requested by the mobile device 402 and/or sent to the mobile device 402 to replenish the video advertisements 416 retrieved from the queue 414. The mobile device 402 may communicate with a video advertisement server over a network by way of networking devices 428. The networking devices 428 may provide wired or wireless networking access for the mobile device 402. Examples of wireless access may include cell phone network access, Wi-Fi access, or similar data network access.

Information about the video advertisements 416 may be communicated back to a video advertisement server by the mobile device 402. For instance, the mobile device 402 may provide the video advertisement server with information about which video advertisements 416 may have been displayed, which video advertisements 416 may still be in the cache 412, whether a link embedded in a video advertisement may have been selected by a customer, whether a customer abandoned watching a video advertisement before the video advertisement finished playing, etc.

Figure 5:
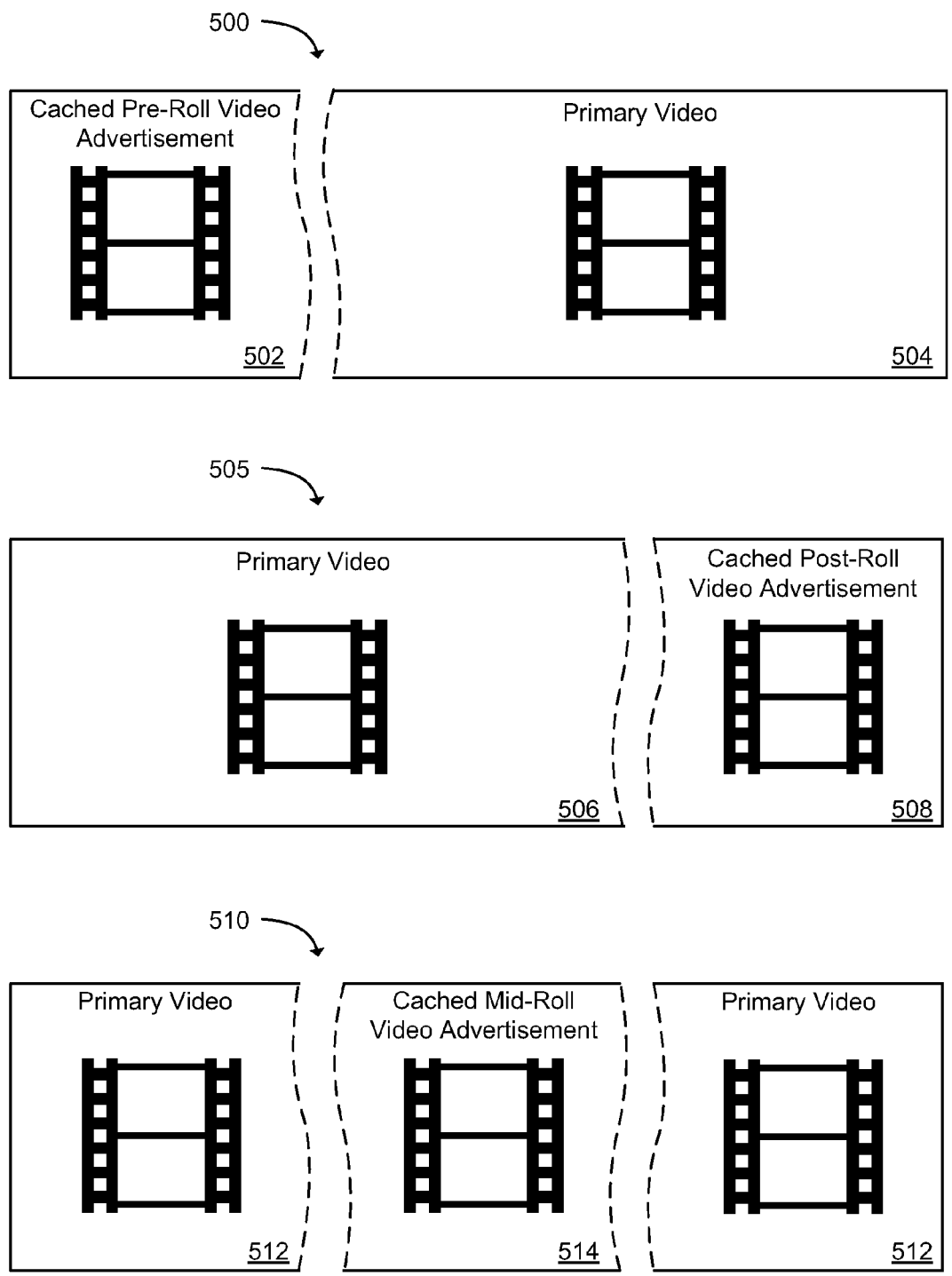
FIG. 5 is a diagram that illustrates an example of client side video stitching.

FIG. 5 is an illustration of video advertisement stitching to a primary video on a client device. The terms "stitch", "stitched" and "stitching" may refer to integrating a video advertisement with a primary video so that the video advertisement and the primary video appear to a customer as a contiguous video playback. Client side stitching refers to an operation of unifying different video files or video streams coming from different sources on a client device. For example, a client device may receive a primary video from one or more sources across a network (e.g., a primary video server) and may retrieve a video advertisement from the client device's cache. The client device may stitch the video advertisement to the primary video. FIG. 5 provides three examples of stitching a video advertisement to a primary video. The first example 500 is an example of a pre-roll video advertisement 502 that may be displayed to a customer prior to displaying a primary video 504. The pre-roll video advertisement 502 may be retrieved from the client device's cache and the pre-roll advertisement 502 may then be stitched to the beginning of the primary video 504.

The second example 505 is an example of a post-roll video advertisement 508 that may be displayed to a customer after a primary video 506 has finished playing. The post-roll video advertisement 508 may be retrieved from the client device's cache and may be stitched to end of the primary video 506. The third example 510 is an example of a mid-roll advertisement 514 that may be stitched or inserted into defined locations within a primary video 512. The mid-roll video advertisement 514 may be inserted at any point within the primary video 512 and may be inserted more than one time within the primary video 512. For example, the mid-roll advertisement 514 may be retrieved from the client device's cache and may be inserted into the primary video 512 in multiple places so that the mid-roll advertisement 514 may be displayed to a customer watching the primary video 512 at multiple points during the primary video 512. In addition, a pre-roll, post-roll and mid-roll advertisement may be stitched into a primary video so that a customer may be presented with a video advertisement at the beginning of a primary video, during the primary video and at the end of the primary video.

Figure 6:
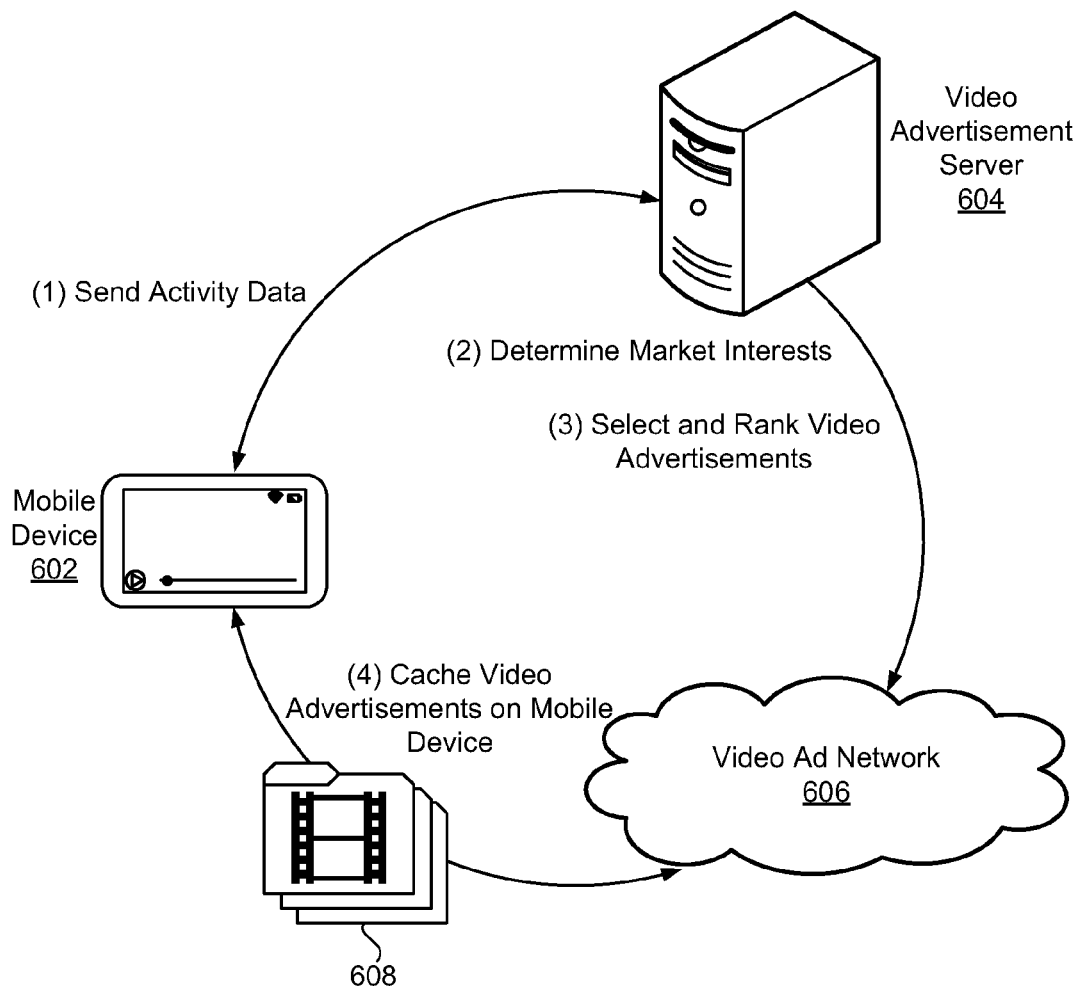
FIG. 6 is a diagram illustrating an example method for selecting video advertisements to display on a mobile device.

FIG. 6 is an illustration of one example of a method for selecting video advertisements to cache on a client device, such as a mobile device 602. A mobile device 602 may be in communication with a video advertisement server 604 that may determine one or more video advertisements to display on the mobile device 602. The video advertisements provided to the mobile device 602 may be cached on the mobile device 602 so that the video advertisement may be available to display to a customer prior to a customer requesting and watching a primary video or content video. For example, when a customer selects a video to watch on the mobile device 602, a video advertisement may be retrieved from the mobile device's cache and displayed to the customer prior, during or after the video. Because the video advertisement may be located on the client device 602, there may be low latency in retrieving the video advertisement as opposed to the latency involved in requesting and receiving a video advertisement from a video advertisement server 604 at the time a customer selects a video.

The video advertisement server 604 may identify a customer that may be associated with the mobile device 602 by way of a customer account login, unique device identifier (UDID), international mobile Station equipment identity (IMEI), mobile equipment identifier (MEI), electronic cookie or other like identifier. The mobile device 602 may provide the advertisement server 604 with additional customer's activity data on the mobile device 602 and the activity data may be used with the customer profile to determine one or more video advertisements to serve to the mobile device 602. Activity data collected on a mobile device 602 may include search history, browsing history, media consumption history, mobile device geophysical location history, etc. As mentioned, the video advertisement server 604 may have access to a customer's account containing profile data that may be used in combination with the customer's activity data to determine which video advertisements to serve to the mobile device 602.

In addition to sending a customer's activity data, the mobile device 602 may communicate to the video advertisement server 604 information about the video advertisements that may be stored in the mobile device's cache. For instance, the mobile device 602 may provide to the advertisement server 604 which video advertisements may have been displayed to a customer and which video advertisements may be stored in the mobile device's cache.

Upon receiving activity data from the mobile device 602, the video advertisement server 604 may use the activity data to determine a customer's market interests. A customer's market interests may be estimated by examining the customer's activity data as well as the customer's profile data. For example, based upon past purchases, internet searches, browsing behavior, media consumption, demographics, geophysical locations, an analysis may be made about what video advertisements a customer may be interested in viewing. For instance, activity data and profile data for a customer may reveal that a customer purchased cooking tools from an electronic retailer, visits recipe sites and frequently shops at various specialty food markets. Based upon the activity data and profile data, the customer may be interested in viewing video advertisements that relate to cooking.

The video advertisement server 604 may select and rank one or more video advertisements based on the customer's market interests. In a case where a customer's market interests may include cooking, historical biographies and monster truck shows, video advertisements that may be related with the above market interests may be selected by the video advertisement server 604. The video advertisements selected may then be ranked by the video advertisement server 604. A ranking may be determined by how well a particular video advertisement may be aligned with a customer's market interest. For instance, several video advertisements may be selected that relate to a market interest. Among the video advertisements, some video advertisements may relate more closely to a customer's market interest than other video advertisements. Those video advertisements that relate more closely to a customer's market interests may be ranked higher than other video advertisements.

Once the video advertisements may have been selected and ranked, the video advertisement server 604 may, in one example, instruct the mobile device 602 to request the video advertisements from a video advertisement network 606. In another example, the video advertisement server 604 may instruct a video advertisement network 606 to cache the selected video advertisements 608 on the mobile device 602. The video advertisement server 604 may also provide the rankings of the video advertisements 608 to the mobile device 602 and instruct the mobile device 602 to store the video advertisements 608 in a data structure such as a queue, array, tree, or stack located in the mobile device's cache in an order according to the rankings assigned to the video advertisements 608.

Figure 7:
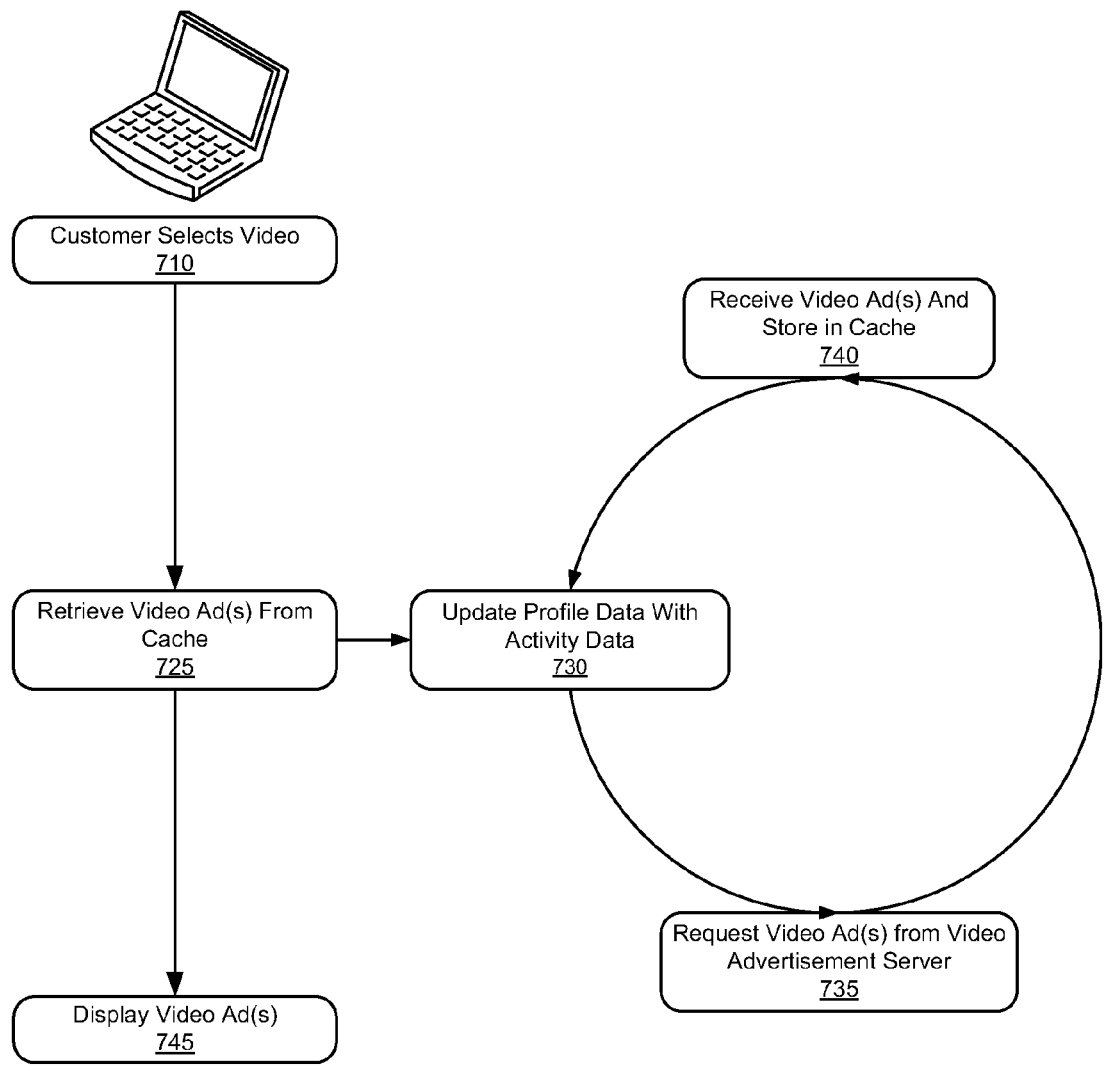
FIG. 7 is a flow diagram illustrating an example method for selecting video advertisements to display.

FIG. 7 is a flow diagram illustrating an example method executed on a client device for selecting video advertisements to display to a customer according to the present technology. As in block 710, a customer may select a video to play on a client device. In this example, a client device may be any device that may be capable of receiving and displaying a video advertisement, such as a desktop computer, laptop or notebook computer, cell phone, smart phone, tablet computer, smart TV, electronic book reader or other devices with like capability. The video may be streamed or downloaded over a network, such as the Internet, from a video content provider to the client device. The video may be a movie, TV show, news broadcast, community uploaded video, personal video or any other type of video that may be sent over a network to a client device. Upon selecting a video, a video advertisement may be displayed to a customer prior to a video, sometime during the playback of the video (e.g., at the midpoint of the video) and/or after a video may have finished playing. The video advertisement may provide any type of information that may be communicated to a customer via a video advertisement. Examples include promoting products and/or services, providing public service announcements, political advertisements, etc.

In one example, when a video may be selected by a customer, an advertisement server may instruct the client device to display one or more video advertisements at certain points during the playback of the video. Logic executed on the client device may instruct the client device to retrieve the one or more video advertisements from the client's cache in local storage. As in block 725, the one or more video advertisements may be retrieved from the cache and, as in block 740, the one or more video advertisements may be displayed to the customer at predetermined points before, during and/or after the video.

When one or more video advertisements may be retrieved from the client device's cache, the client device may obtain additional video advertisements by requesting one or more video advertisements from a video advertisement server to replace the video advertisements retrieved from the cache. A video advertisement server may be provided by a marketing entity, such as a company, that may associate advertisers with video content providers that may wish to host video advertisements. A function of a video advertisement server may be to match video advertisements to customers using client devices based upon a number of customer related criteria (e.g., location, demographics, product type, history, etc.). A video advertisement may be used to promote products and/or services using a video format that may, in some cases incorporate embedded links that may direct a customer to an electronic page (e.g., website) when selected, text, banners, media player skins that may surround the video experience and/or rich media (e.g., newscast scroll, customer controlled slide show, captioning, etc.).

As in block 730, the client device may update a customer's profile data with activity data after retrieving video advertisements from the cache. Updating profile data with activity data may be done prior to requesting additional video advertisements so that a video advertisement server may use current customer profile data when selecting video advertisements to cache on the client device. Activity data may be information about the type of activities or actions that a customer may perform using the client device. Examples of activity data may include media consumption, purchases, searches, browsing history, etc. In one example, a customer's profile data may be maintained on the client device and may be shared with a video advertisement server. In another example, a customer's profile data may be stored on a computing device other than the client device and may be accessible to a video advertisement server over a network. The client device may provide updates to the customer's profile data located on the computing device.

As in block 735, the client device may request additional video advertisements to replace video advertisements retrieved from the cache. The video advertisement server may also identify the client device so that the client device may be associated with a customer. The video advertisement server, in one example, may identify the client device by a persistent record (e.g., cookie) created and stored in the client device's local storage during a previous video advertisement request. Alternatively, a client device ID, such as a unique device identifier (UDID), international mobile Station equipment identity (IMEI) and/or mobile equipment identifier (MEI), for example, may be used to identify a client device.

Once the video advertisement server may have identified the client device, the advertisement server, in one example, may retrieve profile data for a customer associated with the client device. From the profile data, the video advertisement server may be able to determine a number of market interests for the customer. For instance, the video advertisement server may determine that a customer may be interested in certain products, service, political causes, social causes or other types of information that may be communicated via a video advertisement. Once the video advertisement server may have identified one or more market interests for a customer, the video advertisement server may then identify one or more video advertisements that may have a correlation to the market interests. The video advertisements identified may be selected and ranked based upon how well the video advertisements align with the customer's market interests.

As in block 740, the client device may receive from the video advertisement server one or more video advertisements that the client device may then store in a cache in the client device's local storage. In one example, video advertisements may be placed in a data structure within the client device's cache such as a queue. The queue may be based upon a first-in, first-out (FIFO) queue processing technique. Video advertisements stored at the front of the queue may be top ranked video advertisements and successively ranked video advertisements may be stored behind the top ranked video advertisements in the queue. When a video advertisement may be requested from the cache, the video advertisement at the front of the queue may be selected. When additional video advertisements may be added to the queue, the video advertisements may be added to the end of the queue, or the queue may be rearranged according to the rankings of the video advertisements contained in the queue and the additional video advertisements received from the video advertisement server.

The number of video advertisements that may be stored on a client device may depend upon the client device type. For example, in the case where a client device type may be a mobile device, several factors may be considered in determining the number of video advertisements to cache on the mobile device. For instance, fewer electronic advertisements might be cached where the amount of storage available on the mobile device may be limited, or the amount of data a mobile device may download under a service provider's data plan is limited. On the other hand, in a case where a client device may have ample storage and an unlimited data plan, more video advertisements may be cached on the client device. Further, the number of video advertisements stored on the client device may be dependent upon the amount of network bandwidth that may be available to the client device. Thus, how fast or slow a client device's network connection is may then determine the number of video advertisements stored on the client device.

Also, the number of video advertisements cached on a client device may be determined by a client device's connectivity patterns to a network, such as the Internet. For example, some types of client devices may intermittently connect to a network and therefore a greater number of video advertisements may be cached on client devices that sporadically connect to network. Other types of client devices may be connected to a network on a regular basis. These client devices may have fewer video advertisements cached on the client device because the client devices may have more connectivity to a network, which may provide additional time and/or bandwidth where an electronic advertisement may be requested by the client device.

Figure 8:
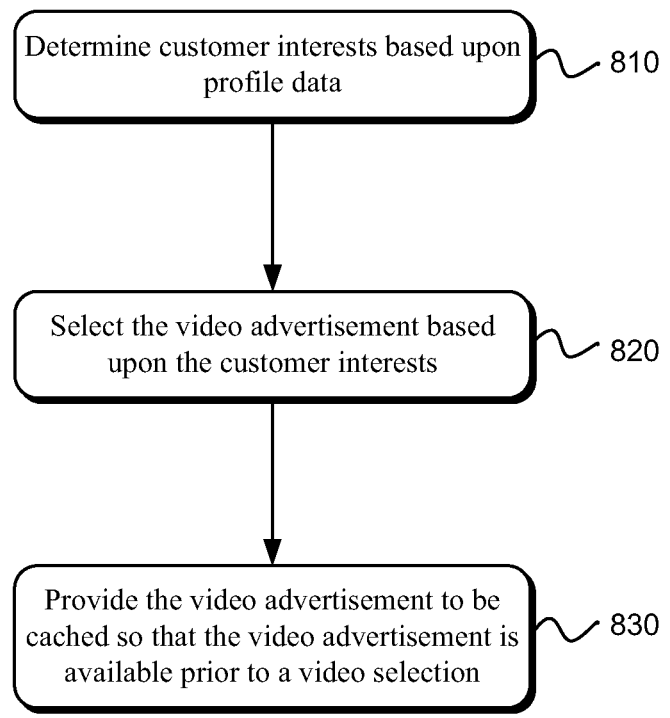
FIG. 8 is a flowchart illustrating an example method for selecting a video advertisement to be presented.

FIG. 8 is a flowchart illustrating an example method executed on a video advertisement server for selecting a video advertisement to be cached on a client device. As in block 810, a video advertisement server may first determine a number of customer interests based upon a customer's profile data. In one example, a customer's profile data may be retrieved from a customer account that contains a record of a customer's activity. An example customer account may contain demographic information as well as customer activity data. Customer interests may be determined from the customer's profile data by analyzing a customer's demographics along with a customer's activity. For instance, if a customer's profile specifies that the customer may be married with children and may have recently searched for theme parks located in Florida, the customer's profile data may indicate that the customer may have an interest for travel packages, theme park discount tickets, hotel accommodations, airfare, rental car, travel insurance, sun care products, theme park novelty items as well as a number of other market interest categories.

Having determined one or more customer interests, the video advertisement server may, as in block 820, select a video advertisement based upon the interests of a customer. Video advertisements may be categorized and/or may be assigned one or more attributes that may be used to associate a video advertisement with a customer interest. As an example, a video advertisement may be an advertisement for a theme park. The video advertisement may be categorized as a theme park advertisement, vacation advertisement and/or Florida advertisement, or attributes may be assigned to the video advertisement such as, theme park, Florida, vacation, families, children, etc. Based upon the categories/attributes assigned to a video advertisement, the video advertisement may be selected that matches or closely matches a customer's interests.

After selecting a video advertisement, the video advertisement server may, as in block 830, provide the video advertisement to a client device to be cached on the client device so that the video advertisement may be available prior to a video selection by a customer. When a customer does select a video to watch, the video advertisement may be retrieved from the client device's cache and displayed to the customer with reduced latency as compared to the latency that may occur when requesting and obtaining a video advertisement from a video advertisement server at the time a customer selects a video.

Figure 9:
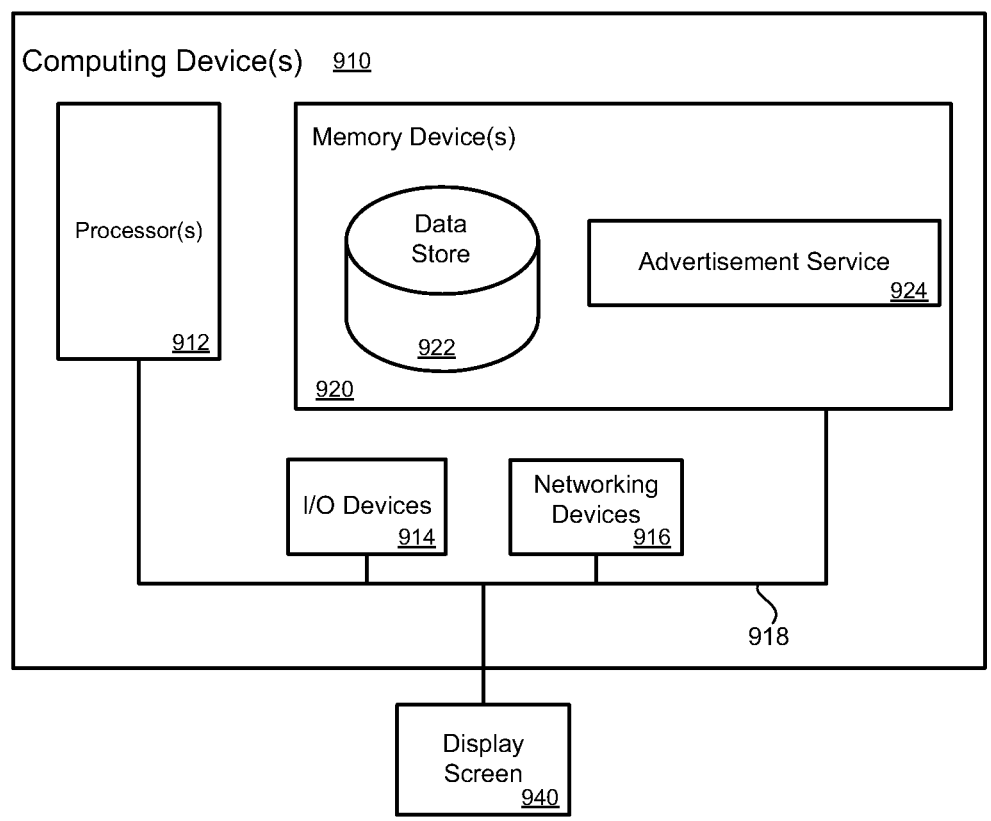
FIG. 9 is block diagram illustrating an example of a computing device that may be used for selecting a video advertisement to be presented.

FIG. 9 illustrates a computing device 910 on which modules of this technology may execute. A computing device 910 is illustrated on which a high level example of the technology may be executed. The computing device 910 may include one or more processors 912 that are in communication with memory devices 920. The computing device 910 may include a local communication interface 918 for the components in the computing device. For example, the local communication interface may be a local data bus and/or any related address or control busses as may be desired.

The memory device 920 may contain modules that are executable by the processor(s) 912 and data for the modules. Located in the memory device 920 are services and modules executable by the processor. For example, an advertisement service 924 and other modules may be located in the memory device 920. The modules may execute the functions described earlier. A data store 922 may also be located in the memory device 920 for storing data related to the modules and other applications along with an operating system that is executable by the processor(s) 912.

Other applications may also be stored in the memory device 920 and may be executable by the processor(s) 912. Components or modules discussed in this description that may be implemented in the form of software using high programming level languages that are compiled, interpreted or executed using a hybrid of the methods.

The computing device may also have access to I/O (input/output) devices 914 that are usable by the computing devices. An example of an I/O device is a display screen 940 that is available to display output from the computing devices. Other known I/O device may be used with the computing device as desired. Networking devices 916 and similar communication devices may be included in the computing device. The networking devices 916 may be wired or wireless networking devices that connect to the internet, a LAN, WAN, or other computing network.

The components or modules that are shown as being stored in the memory device 920 may be executed by the processor(s) 912. The term "executable" may mean a program file that is in a form that may be executed by a processor 912. For example, a program in a higher level language may be compiled into machine code in a format that may be loaded into a random access portion of the memory device 920 and executed by the processor 912, or source code may be loaded by another executable program and interpreted to generate instructions in a random access portion of the memory to be executed by a processor. The executable program may be stored in any portion or component of the memory device 920. For example, the memory device 920 may be random access memory (RAM), read only memory (ROM), flash memory, a solid state drive, memory card, a hard drive, optical disk, floppy disk, magnetic tape, or any other memory components.

The processor 912 may represent multiple processors and the memory 920 may represent multiple memory units that operate in parallel to the processing circuits. This may provide parallel processing channels for the processes and data in the system. The local interface 918 may be used as a network to facilitate communication between any of the multiple processors and multiple memories. The local interface 918 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A method for caching video advertisements, comprising: under control of a processor and memory configured with executable instructions,
   receiving, at a video advertisement server that executes an advertisement service, video advertisement requests for video advertisements from a client device to cache in client device memory;
   retrieving a customer profile for a customer, wherein customer interests are determined from the customer profile;
   identifying attributes of the video advertisements that correspond with the customer profile;
   calculating performance estimates for the video advertisements using the attributes of the video advertisements that correspond with the customer profile, wherein a performance estimate is a probability that an action associated with a video advertisement will be performed;
   selecting a number of the video advertisements based upon the performance estimate for the video advertisements; and
   providing the number of video advertisements to be cached in the memory on the client device so that the number of video advertisements are available prior to a primary video selection, and the number of video advertisements provided to the client device is determined by a connectivity pattern of the client device to a network.

2. A method as in claim 1, wherein the number of video advertisements are cached in a queue on the client device and a video advertisement to be displayed on the client device is selected from a front of the queue.

3. A method as in claim 1, wherein the customer profile is retrieved from a customer's account that is associated with the client device.

4. A method as in claim 1, wherein the customer interests based upon the customer profile are used to determine a plurality of market segments from which the number of video advertisements are selected.

5. A method as in claim 1, further comprising retrieving the video advertisement to be presented from the client device's cache when a video is selected to play.

6. A method as in claim 1, further comprising retrieving the customer profile from a customer's account that contains a record of a customer's activity.

7. A method as in claim 1, further comprising retrieving activity data from the client device that contains a record of a customer's activity.

8. A method as in claim 1, wherein the performance estimate is an estimation of how likely a customer is to view the video advertisement, select a link displayed in the video advertisement, purchase a product or service advertised in the video advertisement, or perform an action described in the video advertisement.

9. A method as in claim 1, wherein the video advertisement is a pre-roll, mid-roll or a post-roll video advertisement.

10. A method as in claim 1, further comprising removing a video advertisement from the memory of the client device when the video advertisement expires and replacing the video advertisement with a new video advertisement.

11. The method as in claim 1, wherein the number of video advertisements cached on the client device is determined by a client device type.

12. A system for caching video advertisements, comprising:
   a video advertisement server to receive video advertisement requests from a client device and to provide the video advertisements to be cached in memory on the client device;
   an advertisement service that is executable on the video advertisement server, the advertisement service comprising;
   logic that retrieves a customer profile and determines a customer's interests;
   logic that identifies attributes of the video advertisements that correspond with the customer profile;
   logic that calculates performance estimates for the video advertisements using the attributes of the video advertisements that correspond with the customer profile, wherein the performance estimate is a probability that an action associated with a video advertisement will be performed; and logic that selects a number of the video advertisements based upon the performance estimate for the video advertisements and provides the number of video advertisements to be cached in the memory on the client device so that the number of video advertisements are available prior to a primary video selection, wherein the number of video advertisements provided to the client device is determined by a connectivity pattern of the client device to a network.

13. A system as in claim 12, further comprising a customer data store accessible to the video advertisement server containing customer accounts from which the customer profile is retrieved.

14. A system as in claim 12, wherein the logic that selects at least one video advertisement further determines a number of video advertisements to cache on the client device.

15. A non-transitory machine readable storage medium having instructions embodied thereon, the instructions when executed by a processor:
  receive, at a video advertisement server that executes an advertisement service, video advertisement requests for video advertisements from a client device to cache in client device memory;
  retrieve a customer profile for a customer, wherein customer interests are determined from the customer profile;
  identify attributes of the video advertisements that correspond with the customer profile;
  calculate performance estimates for the video advertisements using the attributes of the video advertisements that correspond with the customer profile, wherein a performance estimate is a probability that an action associated with a video advertisement will be performed;
  select a number of the video advertisements based upon the performance estimate for the video advertisements; and
  provide the number of video advertisements to be cached in the memory on the client device so that the number of video advertisements are available prior to a primary video selection, and the number of video advertisements provided to the client device is determined by a connectivity pattern of the client device to a network.

16. A non-transitory machine readable storage medium, as in claim 15, wherein the instructions that when executed by the processor further receive activity data from the client device at the video advertisement server.

17. A non-transitory machine readable storage medium as in claim 15, wherein the instructions that when executed by the processor further instruct the client device to select the video advertisement from a front of a queue and display the video advertisement.

18. A non-transitory machine readable storage medium as in claim 15, wherein the instructions that when executed by the processor further instruct the client device to append the video advertisement to a beginning or end of a video selected by a customer.

19. A non-transitory machine readable storage medium as in claim 15, wherein the instructions that when executed by the processor further instruct the client device to inserting the video advertisement into a body of a video selected by a customer.

* * * * *